United States Patent [19]

Bull et al.

[11] Patent Number: 4,933,665
[45] Date of Patent: Jun. 12, 1990

[54] TURN SIGNAL NON-RETURN INDICATOR

[76] Inventors: Garland E. Bull, Rte. 3, Box 670, Dardanelle, Ark. 72834; Kenneth H. Kalb, 1400 Skyline Dr., North Little Rock, Ark. 72116

[21] Appl. No.: 405,438

[22] Filed: Sep. 11, 1989

[51] Int. Cl.⁵ .............................................. B60Q 1/26
[52] U.S. Cl. ..................................... 340/457; 340/475
[58] Field of Search ................ 340/457, 475; 307/10.8

[56] References Cited
U.S. PATENT DOCUMENTS

| | | | |
|---|---|---|---|
| 4,275,379 | 6/1981 | Nakano et al. | 340/476 |
| 4,403,211 | 9/1983 | Shibata et al. | 340/476 |
| 4,644,318 | 2/1987 | Miyamoto et al. | 340/476 |
| 4,792,785 | 12/1988 | Miyamoto et al. | 340/476 |

Primary Examiner—Joseph A. Orsino
Assistant Examiner—Frank M. Scutch, III
Attorney, Agent, or Firm—Robert R. Keegan

[57] ABSTRACT

There is disclosed a non-return indicator for a turn signal in a road vehicle which may be installed with at most three or four electrical connections; it includes a housing with four lead wires extending to a vehicle ground, a plus 12 volt wire, a right turn circuit wire tap, and a left turn circuit wire tap. The indicator includes a binary counter IC for registering a count of 64, 128, or 256; the count setting may be selectable; a separate time delay IC to reset the counter may be provided. A pair of back to back diodes in the right turn and left turn-connected conductors keep them isolated while the counter receives a count for either right turn or left turn signal flashes; upon reaching the predetermined count the counter signals a gate circuit to provide either a steady or intermittent current to an indicator buzzer, beeper or lamp. Alternatively a storage capacitor will permit the counter or other IC's to be powered only from the turn circuits.

15 Claims, 1 Drawing Sheet

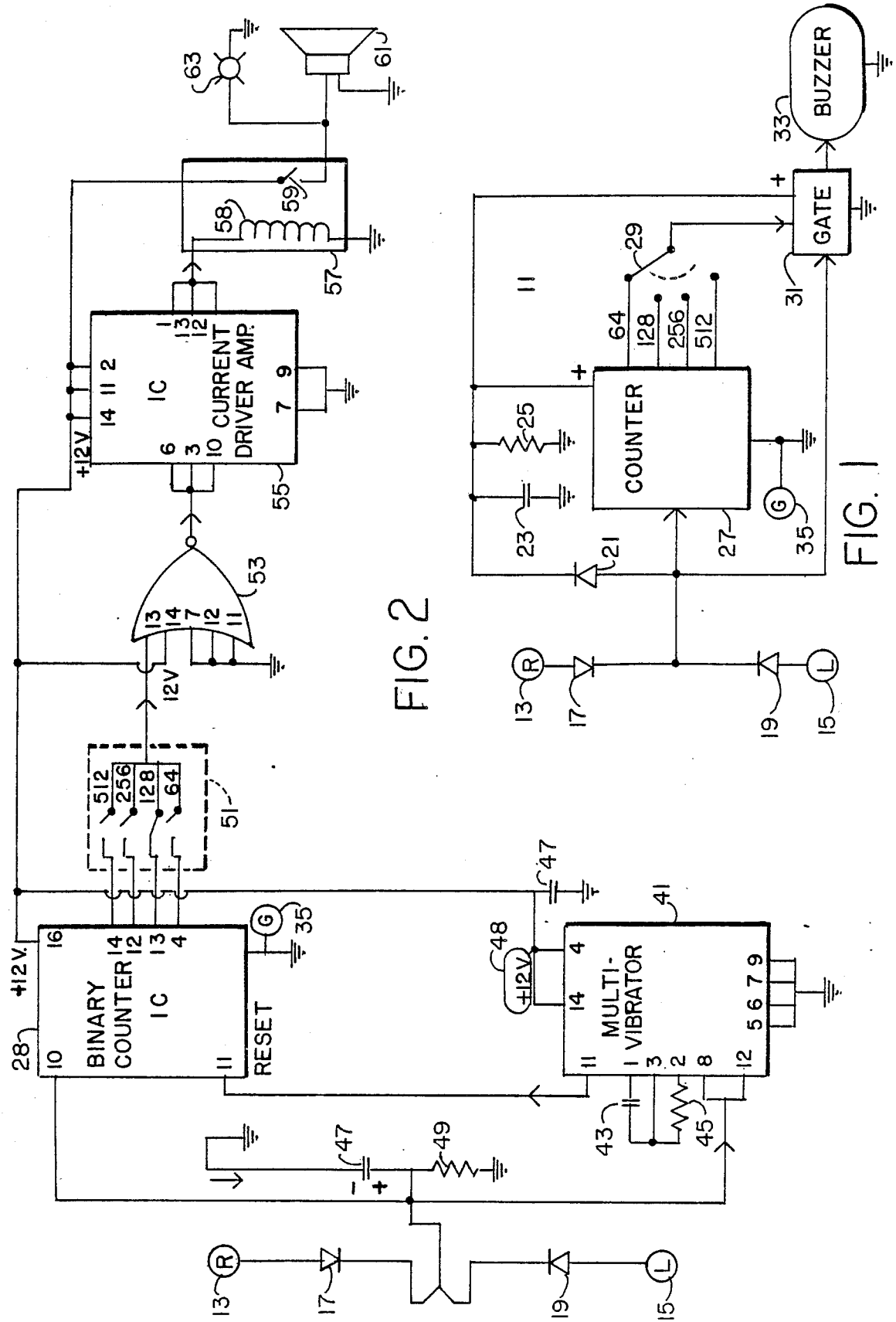

TURN SIGNAL NON-RETURN INDICATOR

The present invention refers to indicators or warnings for advising a passenger car or other road vehicle operator that his turn signal is continuing to flash long after he has turned it on. This can occur because the mechanical return feed to operate when the car was making a lane change or a gentle turn, or for other reasons. This problem has received substantial attention virtually from the time that turn signals became standard equipment. By and large, previous attempts to solve this problem have hot been widely adopted, and only recently automobile manufacturers have incorporated such a feature in the computerized electrical system of new automobiles.

It is not primary the purpose to the present invention to provide a non-return indicator for new automobiles but rather to provide a simple accessory to provide this feature on old or new automobiles which were not so originalLy equipped. It is not necessary to get access to the turn signal lever switch to install the non-return indicator of the present invention and this obviates the requirement for special tools or skill which might otherwise be required. At most, electrical connections for the non-return indicator of the present invention need be made only to an electrical system ground, an electrical system plus 12 volt conductor and the right and left turn light wires. All of these connections are easily found on any automobile or road vehicles and the connections may be made with common connectors such as the readily available tap-in connectors. Accordingly the non-return indicator of the present invention is virtually universally adaptable to existing automotive vehicles.

The system of the present invention operates by counting the flashes of the turn signal and producing a warning when the number of flashes reaches a predetermined number such as 64 or 128. Although this seems a more complicated and expensive way to approach the problem than with a simple thermal timer or the like, it has several advantages and is cost effective due to the low cost of counters and other common forms of integrated circuits. Low cost can be achieved without incorporating all the elements of the circuit in a custom designed integrated circuit chip but such an IC could be produced if it were economically desirable. Use of the counter has advantages over use of timers to initiate the warning in several respects. Most thermal timers include moving parts whereas the counter has no moving parts. Some timers also exhibit substantial temperature dependence which is not present in the counter. Although a timer may be needed to reset the counter when the flasher is off this time period is short and non-critical, ranging from about one second up to 15 seconds or more. Various forms of timers generally have drawbacks for use in a non-return indicator circuit for example thermal timers do not reset quickly and accurately while timers employing an oscillator tend to be complicated and expensive. On the other hand, an integrated circuit binary counter capable of 128 or 256 counts is available which is small in size, inexpensive and requires very little current.

As previously mentioned, numerous attempts have been made to provide a practical inexpensive means for warning a vehicle operator that the turn signal was needlessly flashing. For example U.S. Pat. No. 3,445,810 to Donohoo (U.S. Class 340-56) shows a solid state electrical circuit which sounds an alarm after the directional indicator has been operating for a predetermined length of time. The Donohoo device uses a timer instead of a flash counter and it is intended to be connected at the flasher socket. While connection at the flasher socket is an option for the non-return indicator of the present invention, flasher sockets are not standardized and thus this is a less preferred approach for reversal adaptability of the device.

Another U.S. Pat. No. 3,806,868 to Portman (U.S. Class 340.52D) shows an apparatus which connects to the left-right-off control lever and has the disadvantages which have been discussed previously. U.S. Pat. 3,376,548 to Jabbar et al. (U.S. Class 340.52D) has a warning for prolonged turn signal operation as a part of a more complicated electrical system.

The above referenced patent disclosures as well as the recently available warning features built into the automotive computer system, though they are related in purpose, do not provide apparatus with the capability of the present invention in respect to providing a simple, inexpensive, easily installed accessory device for warning of prolonged turn signal actuation and indicating that the turn signal has not automatically returned as desired.

In addition to providing the features and advantages described above it is an object of the present invention to provide an automotive accessory in the form of a non-restore indicator to warn of prolonged activation of the turn signal flasher which is compact and inexpensive and employs a counter for counting the number of flashes rather than some other form of timing device.

It is another object of the present invention to provide a non-return warning or indicator accessory to be connected into a conventional turn indicator light circuit in a vehicle which requires no more than four tap-in connections to readily accessible wires and provides a reliable audible warning when there have been 64 (or 128) consecutive flashes of the flasher.

It is still another object to provide a non-return indicator for an automobile turn signal which includes a solid state binary counter and a current gate controlled by the counter whereby a beeper, buzzer or a light controlled by the gate will be operated if and only if there are a predetermined large number of consecutive operations of the flasher for the turn signals.

Other objects and advantages of the invention will be apparent from consideration of the following description in conjunction with the appended drawings in which:

FIG. 1 is a simplified block diagram schematically showing a circuit employing a solid state counter for the apparatus of the present invention; and FIG. 2 is a detailed schematic circuit diagram of an operational circuit generally corresponding to the block diagram of FIG. 1.

Referring to the drawings and particularly to FIG. 1 a circuit 11 is shown in block diagram form suitable for the non-return indicator of the present invention. The diagram of FIG. 1 is greatly simplified and normally employed components for coupling circuit stages, for noise suppression or the like are not shown. The circuit of FIG. 1 connects in a conventional automotive turn signal circuit to the right turn light current conductor indicated by R at 13 and the left turn light current conductor indicated L at 15.

In connecting the circuit of FIG. 1 to the turn signal electrical system it is necessary to preserve the isolation of the left turn signal circuit from the right turn signal circuit and semi-conductor diodes 17 and 19 are placed as shown to prevent interaction between the right turn signal conductor 13 and the left turn signal conductor 15. There are a number of different ways such connections could be made and the semi-conductor diodes 17 and 19 may or may not be on the circuit board for circuit 11. For the purpose of explanation it will be assumed that semi-conductor diodes 17 and 19 may or may not be on the circuit board for circuit 11. For the purpose of explanation it will be assumed that semi-conductor diodes 17 and 19 are on the circuit board and two insulated flexible wires are provided together with appropriate connectors to facilitate the connection to the right and left turn signal positive conductors. Throughout this explanation it is assumed that the automotive electrical system has a negative ground, and it will be understood that in the case of positive ground electrical circuits all polarities described would be reversed from plus to minus and vice-versa. It is also assumed that it is a 12 volt system, but the circuits illustrated may be modified readily for higher or lower voltage systems. It may be mentioned that zener diodes with a breakdown voltage of about 12 volts may be utilized in place of the common semi-conductor diodes 17 and 19 and this may provide advantages in terms of immunity from voltage pulses or transients which might otherwise affect the counter circuit.

It will be noted that where the anodes of diodes 17 and 19 are joined a positive voltage of approximately 12 volts will be available whenever either of the right or left turn indicator lamps is flashing. Between flashes there will be no significant voltage at the junction between diodes 17 and 19.

The diodes 17 and 19 are connected to the pulse count input for a counter 27 and are connected to the current input of a current gate 31 and are also connected through diode 21 to provide DC power to counter 27 and to gate 31.

As shown in FIG. 1 it is feasible to use power drawn from the intermittent DC power pulses of the flasher circuit to provide positive DC power for the counter 27 and the gate 31 by use of storage capacity, 23 to maintain current flow to counter 27 and gate 31 during the fraction of a second between flashes of the turn signal lights. Binary counter, IC's or other IC's required for counter 27 may be selected to have current requirements of about five millamps or less and thus a capacitor 23 of about 1,000 microfarads will be adequate to maintain the necessary current flow to counter 27, and if necessary gate 31. Diode 21 prevents pulses to counter 27 from being masked by the charge on capacitor 23. Gate 31 may in some cases comprise a thyristor or SCR circuit that requires virtually no power beyond that supplied by the current input to the gate (thyristor cathode) directly from the pulsating DC at the junction of diodes 17 and 19.

The counter 27 in FIG. 1 may include a time delayed reset of the counter but reset of the counter may alternatively be obtained simply by decay of the charge on capacitor 23. In such case a resistor 25 may be placed in parallel with capacitor 23 to speed the decay of charge on capacitor 23 if the discharge through counter 27 (and through gate 31) does not provide a sufficiently short delay before counter 27 is reset to zero.

When gate 31 is opened by receipt of a signal from counter 27, current is supplied to a buzzer 33 through the coefficient from gate 31 thereby giving an indicate of non-return of the turn signal. A selector switch 29 is shown schematically which permits the count threshold to be set at 64, 128, 256, or 512. The switch 29 is optional and the counter may be set permanently, for 128 counts for example. This will be a desirable setting in most cases for passenger vehicles since it will allow about two minutes before activating the buzzer; this time would accommodate normal delays such as making left turns at traffic lights. Of course the circuit could be modified for any specific count that was desired.

It should be particularly noted that the electronic components including counter 27, gate 31 and/or buzzer 33 may alternatively be powered in a conventional manner from the 12 volt electrical system and in that case the connection to the 12 volt system would replace the connection to the anode of diode 21 (and diode 21 would be unnecessary). In such case counter 27 would include a time delay reset.

A detailed schematic circuit diagram of an exemplary circuit is shown in FIG. 2 and component values and part numbers therefore are listed in Table I below. The specific circuit shown in FIG. 2 by way of illustration is provided with 12 volt DC power from any convenient 12 volt wire of the electrical system as indicated at 48. It is desirable but not essential that the plus 12 volt wire tapped into be a wire that is de-energized when the ignition is off. Also the plus 12 volt connection indicated at 48 will preferably include a suitable fuse such as a one-half ampere fuse. If the power connection is made to a circuit wire that is already fused the additional fuse could be unnecessary.

A capacitor 47 is provided between power connection 48 and ground for noise suppression. Capacitor 47 prevents noise spikes in the automotive electrical system from producing false counts of the binary counter or otherwise interfering with operation of the non-return indicator circuit.

The plus 12 volt power connection 48 is connected to provide power to multivibrator IC 41, binary counter IC 28, amplifier IC 55, NOR circuit 53 and contact 59 of relay 57. All the aforementioned electrical components are connected to a common ground on the circuit board (as indicated schematically) and this ground is connected by a suitable flexible wire connection to any automotive electrical system ground G as indicated at 35.

Pulse signals are received indicating the operation of the turn signal flasher from a right turn lamp conductor 13 and a left turn lamp conductor 15 through diodes 17 and 19 substantially in the same manner as shown in FIG. 2. The diodes 17 and 19 which serve to isolate the right turn conductor 13 from the left turn conductor 15 may be any conventional semiconductor diode device, preferably with a reverse voltage characteristic of at least 16 volts and a current rating of one half ampere or greater. In the specific circuit illustrated one watt 12 volt zener diodes are used for the diodes 17 and 19 (part number IN4742).

The pulsating DC signal received through diode 17 or diode 19 is input to binary counter IC 28 and each flash of the flasher advances the count by one count. A noise suppression capacitor 47 and a load resistor 49 serve to prevent false counts to the binary counter 28.

Multivibrator IC 41 also receives an input from diodes 17 and 19 and acts as a time delay reset circuit for binary counter IC 28. The input pulses are connected to both the retrigger and the plus-trigger inputs of the multivibrator IC 41, and for this mode of operation the output pulse (at pin 11) remains low only as long as the input pulses period is shorter than the period determined by the RC circuit consisting of capacitor 43 and resistor 45; this RC time period is preferably and is suitably determine by a one microfarad capacitor 43 and a one megohm resistor 45.

In operation the multivibrator IC 41 suppresses the reset signal to the binary IC 28 so long as successive flash pulses are being received through diode 17 or diode 19 but shortly after the flash pulses terminate a reset high signal is sent from pin 11 of multivibrator 41 to pin 11 of binary counter 28 thereby setting the counter to zero. In normal operation of the turn signal this would occur before the predetermined count (128 for example) was reached and no warning or indication would be generated.

The binary counter IC 28 iILustrated in FIG. 2 includes a selector switch arrangement indicated in dashed lines at 51. This permits the number of counts required to produce an output to the next stage to be selected from among 64, 128, 256 or 512 counts. The switches of the assembly 51 may be made accessible to the person installing the turn signal non-return indicator to allow setting of the number of flashes (and approximate time elapsed) before a warning is given. Alternatively the number of counts may be preset and not adjustable at some value such as 128 which will give a time delay in the acceptable range.

A NOR gate 53 serves to invert the signal from binary counter 28 to provide the desired input to a current drive amplifier IC 55. IC 55 may consist of a dual complementary pair plus inverter. It acts as a high source-current driver to provide the power necessary to energize a relay 57 which has its coil 58 connected to receive the output of IC 55. A buzzer 61 is connected to the normally open contact 59 of relay 57 and receives power from the 12 volt supply as contact 59 closes in response to the output from binary counter 2B after the present count value has been reached. An optional indicator light 63 may also be connected to the relay contact 59. Lamp 63 may be a 12 volt incandescent lamp incorporated in the turn signal non-return indicator or, if desired, an existing interior lamp of the vehicle could be wired to flash in response to the operation of the relay 57. While relay 57 has been shown connected between buzzer 61 and the positive power supply it could just as well be connected between buzzer 61 and the ground connection. Also the connection from relay 57 leading to the 12 volt power supply could be moved to the junction of the conductors from diodes 17 and 19 with the result that buzzer 61 would not operate continuously but would only operate in synchronism with the flashing of the right or left turn signal lamp. Obviously buzzer 61 may be replaced by any audible signal generator, as desired.

It will be observed that in the specific circuit illustrated in FIG. 2 the electrical components 53, 55 and 57 are generally equivalent to the gate 31 shown in FIG. 1; similarly switch assembly 51 corresponds to selector switch 29. The counter 27 in FIG. 1 may be considered represented by binary counter IC 28 multivibrator IC 41 and the associated circuit elements.

Although the operation of the circuit of FIG. 2 is believed to be apparent from the previous description it will be briefly summarized as follows. The zener diodes 17 and 19 isolate the left flasher line from the right flasher line to maintain proper operation of the flasher circuit. Buffer amplifiers or other conventional means could be employed to perform the same function. IC 28 is a twelve stage ripple carry binary counter which advances one count on the negative transmission of each 12 volt input pulse at pin 10. (A high level on the reset line at pin 11 resets the counter to zero.) Resistor 49 aids in the noise suppression function and provides a load to ground on the input lines when both left and right lines are inactive. Multivibrator IC 41 serves to reset binary counter 28 when it fails to receive a succession of pulses with a period shorter than the period determined by resistor 45 and capacitor 43.

In the assembly of switches 51 the lowest closed switch will preset the number of counts constituting the threshold for a warning indication output from the circuit. NOR gate 53, amplifier 55 and relay 57 all constitute a gate that responds to an output from binary counter 28 and switch assembly 51 to turn on the activating current for buzzer 61 (and lamp 63).

Capacitors 47 connected from the 12 volt input to ground and connected from the junction of diodes 17 and 19 to ground are for noise suppression and to suppress spikes which might cause false triggering of the semiconductor IC's, particularly binary counter 28. As previously mentioned, different semi-conductor electronic components could be employed to perform the functions of the elements of FIG. 2 or FIG. 1 and the circuit configuration could be modified in accordance with customary electronic design techniques.

TABLE I

| RESISTORS | OHMS |
|---|---|
| 25 | 5K |
| 45 | 1 M |
| 49 | 1K |
| CAPACITORS | MICROFARADS |
| 47 | 330 |
| 43 | 1 |
| 23 | 1000 |
| SEMI-CONDUCTORS | TYPE |
| 17, 19 | IN4742 |
| 21 | IN4001 |
| IC's | TYPE |
| 28 | 4040 |
| 41 | 4047 |
| 53 | 4000 |
| 55 | 4007 |
| COMPONENTS | MFR. NO. |
| 57 | ARCHER #275-241 |
| 61 | ARCHER #273-058 |

All the components of FIG. 2 may be mounted on a small circuit board and provided with a suitable housing or certain elements such as the buzzer 61 or the indicator lamp 63 could be separate from the main circuit board. In any case it is desirable to provide means for facilitating the installation of the apparatus to the maximum extent possible. Thus it is preferred that insulated wire leads of several feet in length be provided for connection to the plus 12 volts at 48, to the ground connection 35 and to the right and left turn lamp wires 13 and 15. Also tapin connectors may be provided to make the connections without stripping wires. An eyelet connector for ground connection 35 to facilitate connection to the metal frame of the vehicle at an existing screw connection may also be provided. Within the scope of the invention one could also provide connectors particularly adapted to fit in the flasher socket and then to receive the flasher in a socket portion thereof whereby all or nearly all of the necessary electrical connections could be obtained from the flasher socket. While this would be convenient for automobiles with the most common form of flashers and sockets it has a disadvantage that it would lack universally. Both a standard flasher socket connection as well as tap-in connections could be provided in the package received by the purchaser.

In addition to the numerous variations and modifications of the invention shown, described or suggested above, other variations or modifications to the invention will be apparent to those skilled in the art and accordingly the scope of the invention is not to be considered limited to the particular embodiments and variations described and suggested but is rather to be determined by reference to the appended claims.

What is claimed is:

1. In an automotive turn signal apparatus having a flasher, a right-left-off switch, left and right signal lights, and left and right electrical circuits for said lights, the improvement comprising
   (a) a non-return indicator circuit having at least three terminals including at least one positive input terminal, a negative ground terminal and an output terminal,
   (b) means for connecting said at least one positive input terminal to at least one conductor of said left and right electrical circuits which has a positive voltage during operation of either said left or said right signal lights,
   (c) a power bus for said non-return indicator circuit and means for connecting said bus to one of said at least three terminals excluding said negative ground terminal and said output terminal as a source of at least intermittent positive d.c. power for the purpose of providing power to circuit components of said indicator circuit,
   (d) an electrically activated indicator for producing an indication of a predetermined number of successive operations of said right or said left signal lights,
   said non-return indicator circuit of (a) including
   (1) a solid-state counter having at least one output terminal and connected to receive power from said bus and connected to receive countable pulses from said means for connecting said at least one positive input terminal to at least one conductor of said left and right electrical circuits, and
   (2) means for connecting said at least one output terminal of said solid-state counter to said indicator thereby activating said indicator only when the number of successive operations of said right and left signal lights exceeds a predetermined number determined by said solid-state counter.

2. Apparatus as recited in claim 1 wherein said means for connecting said at least one positive input terminal to at least one conductor of said left and right electrical circuits includes conductors connecting from said at least one positive input terminal to both said left and right electrical circuits.

3. Apparatus as recited in claim 2 further including means for isolating said left and right electrical circuits from one another.

4. Apparatus as recited in claim 1 wherein said solid-state counter comprises an integrated circuit: binary ripple counter of at least six states.

5. Apparatus as recited in claim 1 wherein said power bus to a continuous positive d.c. power source.

6. Apparatus as recited in claim 1 wherein said power bus is connected to said at least one positive input terminal and further including means for storing an electrical charge from said power bus between flash pulses of said left or right electrical circuit.

7. In an automotive turn signal apparatus having a flasher, a right-left-off switch, left and right signal lights, and left and right electrical circuits for said lights, the improvement comprising
   (a) a circuit board having circuit components thereon and at least three terminals including at least one positive input terminal, a negative ground terminal and an output terminal,
   (b) means for connecting at least one positive input terminal to at least one conductor of said left and right electrical circuits which has a positive voltage during operation of either said left or said right signal lights, and
   (c) a power bus for said circuit board and means for connecting said bus to one of said at least three terminals excluding said negative ground terminal and said output terminal as a source of at least intermittent positive d.c. power for the purpose of providing power to said circuit components,
   said circuit components including:
   (1) a solid-state binary counter circuit having at least one output terminal, said counter circuit being connected to receive power from said bus, and to receive countable pulses from said means for connecting at least one positive input terminal to at least one conductor of said left and right electrical circuits,
   (2) a current gate circuit having a current input, a current output and a control input, said current input being connected to said bus and said control input being connected to receive an output from at least one output terminal of said binary counter circuit, and
   (3) means for connecting said gate circuit current output to power an indicator thereby activating said indicator only when the number of successive operations of said left or right signal lights exceeds a preset number determined by said binary counter circuit.

8. Apparatus as recited in claim 7 wherein said means for connecting at least one positive input terminal to at least one conductor of said left and right electrical circuits includes conductors connecting from said at least one positive input terminal to both said left and right electrical circuits.

9. Apparatus as recited in claim 8 further including means for isolating said left and right electrical circuits from one another.

10. Apparatus as recited in claim 7 wherein said power bus is connected to a continuous positive d.c. power source.

11. Apparatus as recited in claim 1 wherein said power bus is connected to said at least one positive input terminal and further including means for storing an electrical charge from said power buss between flash pulses of said left or right electrical circuit.

12. Apparatus as recited in claim 11 further including an audible signal generator serving as an indicator.

13. Apparatus as recited in claim 12 wherein said current gate circuit further includes a solid-state current switching device for providing said gate circuit current output.

14. Apparatus as recited in claim 7 further including an audible signal generator serving as an indicator.

15. In an automotive turn signal apparatus having a flasher a right-left-off switch, left and right signal lights, and left and right electrical circuit: for said lights, the improvement comprising (a) a circuit board having circuit components thereon and at least four terminals including at least one positive input terminal, a negative ground terminal, a pulse count input terminal, and an output terminal, (b) means for connecting said pulse count input terminal to a conductor of said left electrical circuit and a conductor of said right electrical circuit: each of which has a positive voltage only during operation of said left or said right signal lights respectively, (c) means for isolating said left and right electrical circuits from one another, (d) a power bus for said circuit board and means for connection said bus to said positive input terminal for the purpose of providing power to said circuit components, and (e) an indicator r for producing an indication of more than a predetermined number of successive operations of said right or said left signal lights.

said circuit components of (a) including:

(1) a solid-state binary counter circuit connected to receive power from said bus and to receive countable pulses from said pulse count input terminal and having at least one output terminal, (2) a time delay multi-vibrator circuit connected to reset pulse count input terminal, (3) a current gate circuit having a current input, a current output and a control input said current input being connected to a source of at least intermittent positive d.c. power and said control input being connected to receive an output from at least one output terminal of said binary counter circuit and (4) means for connecting said gate circuit current output to power said indicator.

* * * * *